(12) United States Patent
Mitchell et al.

(10) Patent No.: US 10,837,653 B2
(45) Date of Patent: Nov. 17, 2020

(54) HIGH EFFICIENCY GREASE FILTER

(71) Applicant: Kason Industries, Inc., Newnan, GA (US)

(72) Inventors: Brett A. Mitchell, Newnan, GA (US); Raymond J. Hiller, Newnan, GA (US); Todd Peters, Winston, GA (US)

(73) Assignee: Kason Industries, Inc., Newnan, GA (US)

( * ) Notice: Subject to any disclaimer, the term of this patent is extended or adjusted under 35 U.S.C. 154(b) by 137 days.

(21) Appl. No.: 16/054,442

(22) Filed: Aug. 3, 2018

(65) Prior Publication Data
US 2020/0041140 A1     Feb. 6, 2020

(51) Int. Cl.
*F24C 15/20* (2006.01)
*B01D 45/08* (2006.01)

(52) U.S. Cl.
CPC .......... *F24C 15/2035* (2013.01); *B01D 45/08* (2013.01); *F24C 15/2042* (2013.01); *F24C 15/2078* (2013.01)

(58) Field of Classification Search
CPC .................................................. F24C 15/2035
USPC ................................ 126/299 D; 55/444, 446
See application file for complete search history.

(56) References Cited

U.S. PATENT DOCUMENTS

| | | | | |
|---|---|---|---|---|
| 3,910,782 | A * | 10/1975 | Struble | B01D 45/08 55/444 |
| 6,454,825 | B1 * | 9/2002 | Cheimets | B01D 45/08 55/446 |
| 6,656,244 | B1 * | 12/2003 | Galassi | B01D 45/06 55/444 |
| 7,581,539 | B2 * | 9/2009 | Aviles | B01D 45/08 126/299 D |
| 2007/0163216 | A1 * | 7/2007 | Smasal | B01D 45/08 55/446 |

\* cited by examiner

*Primary Examiner* — Avinash A Savani
(74) *Attorney, Agent, or Firm* — Baker Donelson

(57) ABSTRACT

A grease filter (10) has a frame (12) and a grease filter baffle assembly (14) which includes a front (30), a rear panel (32), and an air deflector assembly (34). The front panel has entrance openings (38) therethrough and a series of first bypass holes (42) therethrough. Similarly, the rear panel has a series of exit openings (46) therethrough and a series of fourth bypass holes (50) therethrough. The air deflector assembly has a repeating series of convoluted first baffle walls (56) and a repeating series of convoluted second baffle walls (58). The first baffle walls include second bypass holes (60) therethrough. The second baffle walls includes third bypass holes (62) therethrough. The combination of the front panel, first baffle walls, second baffle walls, and rear panel create a primary air flow channel (66) and a bypass air flow path (68).

24 Claims, 6 Drawing Sheets

HIGH EFFICIENCY GREASE FILTER

TECHNICAL FIELD

This invention relates to kitchen grease filters that operate with a kitchen cooking area ventilation system.

BACKGROUND OF THE INVENTION

Grease filters are used in commercial and residential kitchens in order to filter airborne fatty particles or grease created by the cooking process. These grease filters are typically positioned within the ventilation system of a cooking area. The grease filter prevents the grease from being deposited within the duct work of the ventilation system. This helps in reducing maintenance and cleaning of the ventilation system, which requires the closing of the kitchen and the loss of income. However, even with the use of such grease filters, an amount of grease still gets deposited within the duct work, which increases the chance of having a fire within the ventilation system.

Commercial grade grease filters typically utilize a box like frame having one or more internal baffles. The grease filter is designed to be removable and cleanable, and made of aluminum, stainless steel, or galvanized steel. These grease filters work on the principle of having the air flow carrying the fatty particles passing through openings and having to turn through a convoluted or tortuous path during which time the fatty particles are separated onto the surfaces of the baffles. This type of grease filter is shown in U.S. Pat. No. 6,656,244.

A problem with this type of grease filter is that the tortuous path causes an increase in the low pressure restriction through the grease filter. However, the air flow pressure restriction of such grease filters should not exceed 1.5 inches of water. To counter act this air flow restriction the ventilation system may utilize extra motors or fans to aid in the extraction. However, this also causes additional noise and vibration, which is detrimental in a restaurant environment by increasing costs, making it difficult to communicate food orders, and creating an uncomfortable work environment.

In addition to collecting fatty particles, the grease filter is also utilized as a flame stop by preventing the intense heat and energy from an open flame from entering the exhaust hood or chimney. The arresting of the frame at the grease filter restricts the occurrence of a fire within these ventilation components.

Accordingly, it is seen that a need exists for a grease filter which efficiently removes grease particles from an air flow without causing a significant increase in restricting the flow of air. It thus is to the provision of such that the present invention is primarily directed.

SUMMARY OF THE INVENTION

A grease filter comprises a frame and a baffle assembly coupled to the frame. The baffle assembly includes a front panel having a plurality of front panel elongated slots therethrough, a rear panel having a plurality of rear panel elongated slots therethrough, and an air deflector assembly positioned between the front panel and the rear panel. The air deflector assembly has a plurality of primary channels defined by a plurality of baffle walls and a plurality of bypass channels defined by a plurality of holes extending through the baffle walls. With this construction, an airstream passing through the grease filter has a portion passing through the primary channel and a portion passing through the bypass channel.

DETAILED DESCRIPTION

Figure 1:
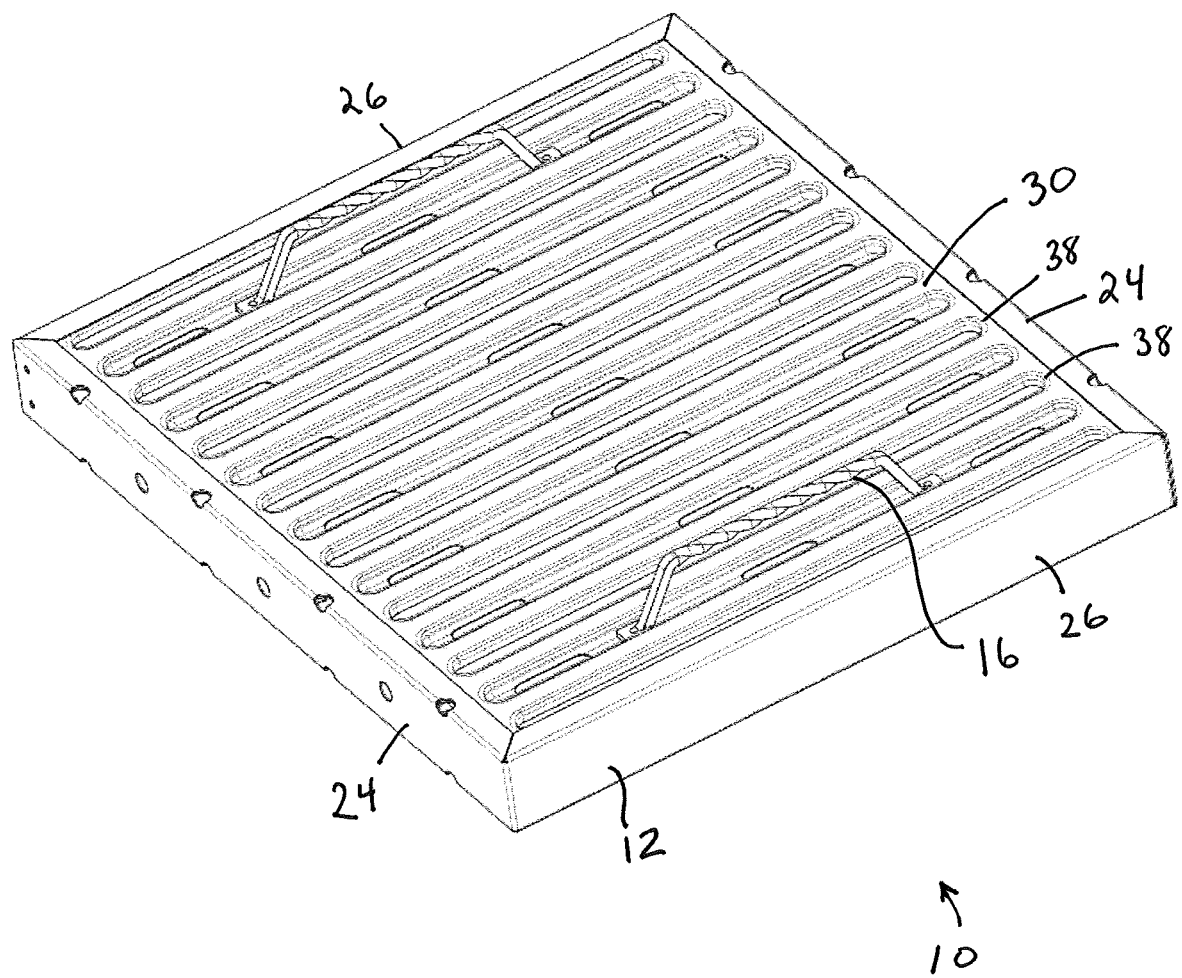
FIG. 1 is a perspective view of the grease filter in a preferred form of the invention.
Figure 2:
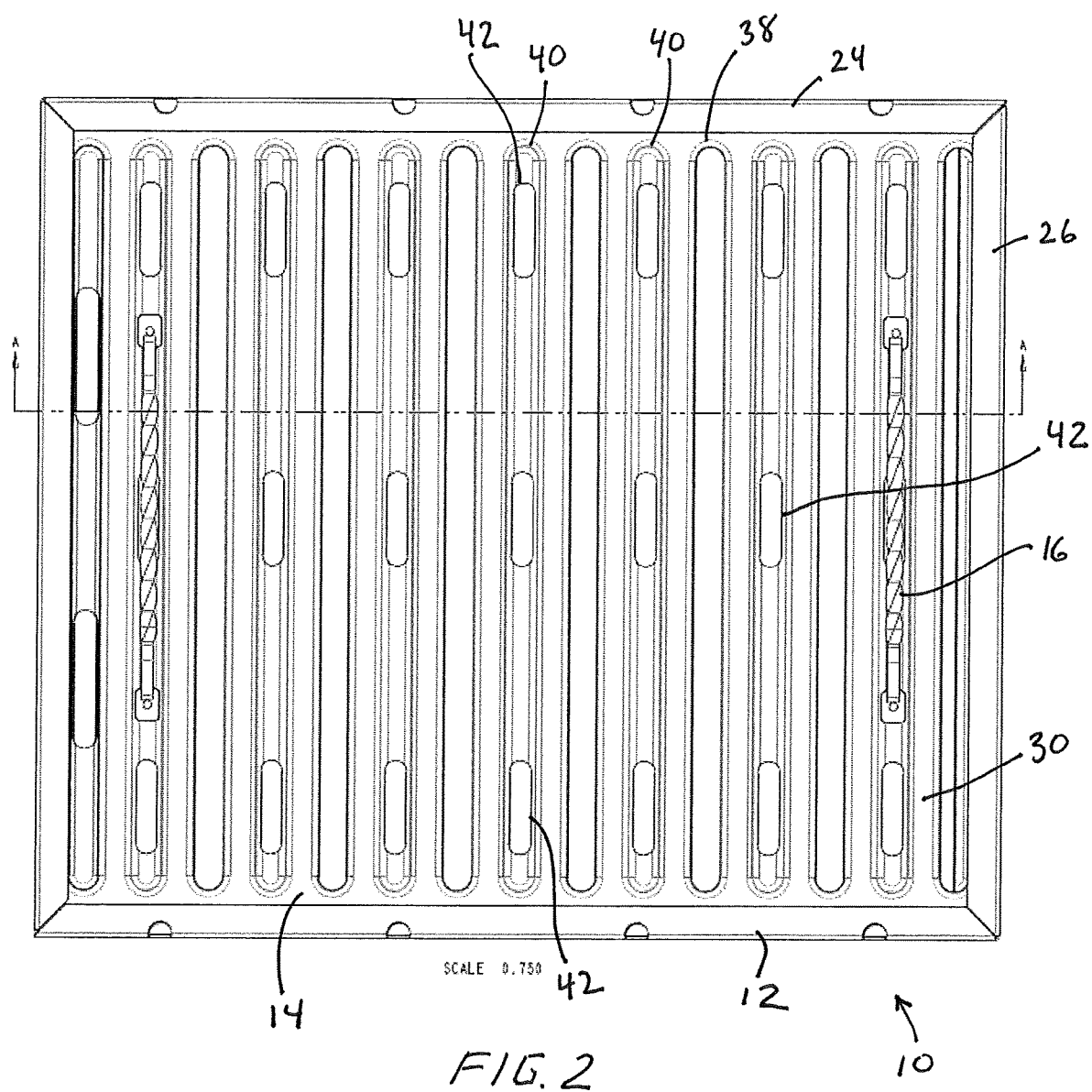
FIG. 2 is a top view of the grease filter of FIG. 1.
Figure 3:
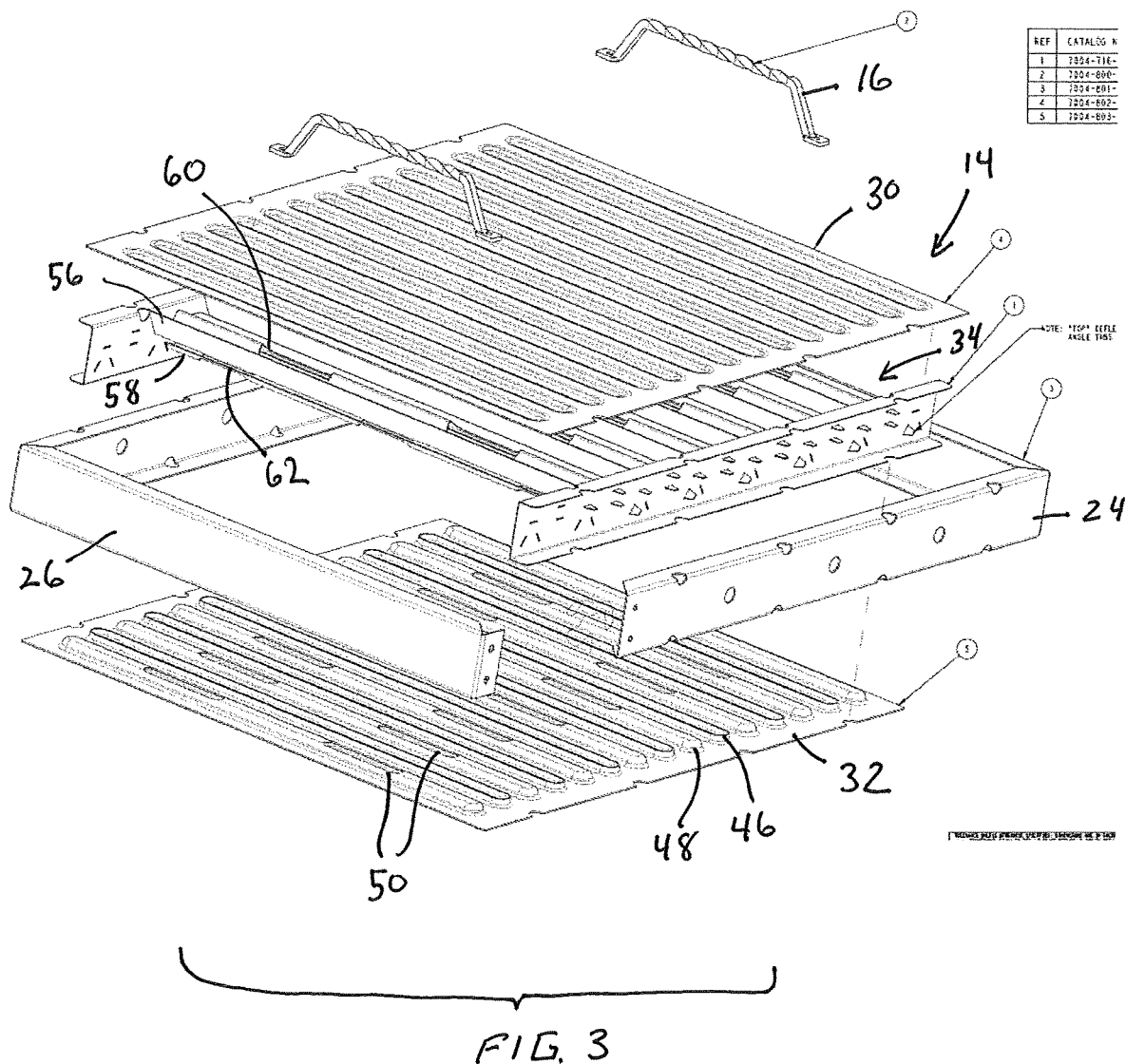
FIG. 3 is an exploded, perspective view of the grease filter system of FIG. 1.

With reference next to the drawings, there is shown a grease filter 10 in a preferred form of the invention. The grease filter 10 includes a rectangular filter frame or housing 12, a grease filter baffle assembly 14, and a pair of handles 16. The grease filter 10 is configured to mate with the ventilation system mounted over the cooking area of a typical restaurant.

The housing 12 includes a pair of oppositely disposed side channels or walls 24 and a pair of oppositely disposed end channels or walls 26. The frame side walls 24 and end walls 26 are generally U-shaped to receive and hold the filter baffle assembly 14.

The baffle assembly 14 includes a front or top panel 30, a rear or bottom panel 32, and an air deflector assembly 34 positioned between the front panel 30 and rear panel 32. The front panel 30 has a series of eight generally mutually parallel, elongated entrance slots or openings 38 therethrough and a series of seven generally mutually parallel elongated recesses or depressions 40 positioned between each adjacent pair of openings 38. Each front panel elongated recess 40 has a series of three first bypass holes 42 therethrough. Similarly, the rear panel 32 has a series of seven generally mutually parallel, elongated exit slots or openings 46 therethrough and a series of eight generally mutually parallel elongated recesses or depressions 48 positioned between each adjacent pair of openings 46. Each rear panel elongated recess 48, except for the rightmost in the drawings, has a series of three fourth bypass holes 50 therethrough (the second and third bypass holes are described hereinafter). The rightmost recess does not include a fourth bypass hole because there are not first bypass holes associated therewith. The front panel entrance openings 38 are generally aligned depth wise across the grease filter 10 from the rear panel recesses 48, while the front panel recesses 40 are generally aligned depth wise across the grease filter 10 from the rear panel exit openings 46. The term depth wise used herein is intended to describe a direction across the grease filter from front to back, i.e., from the front panel 30 to the rear panel 32.

The air deflector assembly 34 has a repeating series of convoluted first baffle walls 56 and a repeating series of convoluted second baffle walls 58. The first baffle walls 56 include a series of second bypass holes 60 therethrough. The second baffle walls 58 includes a series of third bypass holes 62 therethrough. The second bypass holes 60 are generally positioned between adjacent pairs of first bypass holes 42 so that they are longitudinally and laterally offset (not aligned) from each other along the longitudinal direction of the elongated recesses 40 of the front panel 30, the term between or aligned used herein is intended to mean a position aligned between the first bypass holes even through it is laterally offset (not aligned) from the first bypass holes and therefore not physically located between them. The term longitudinally offset in the direction of the elongated recesses also means that they are laterally offset when compared to adjacent holes, slots, or openings as shown in the drawings. The term laterally used herein is intended to mean a direction extending between the end walls 26 essentially parallel to the elongated length of the side walls 24. The term longitudinal used herein is intended to mean a direction extending between the side walls 24 essentially parallel to the elongated length of the end walls 24 and generally perpendicular to the lateral direction.

The third bypass holes 62 are generally positioned between adjacent pairs of second bypass holes 60 so that they are longitudinally and laterally offset (not aligned) from each other along the same longitudinal and lateral direction. The fourth bypass holes 50 are generally positioned between adjacent pairs of third bypass holes 62 so that they are longitudinally and laterally offset (not aligned) from each other along the same longitudinal and lateral direction. The combination of the front panel 30, first baffle walls 56, second baffle walls 58, and rear panel 32 create or define a primary air flow path or channel 66 and a secondary or bypass air flow path 68 (the flow path/channel are both represented by 66 as the arrow representing the flow path simply follows the channel structure).

Figure 4:
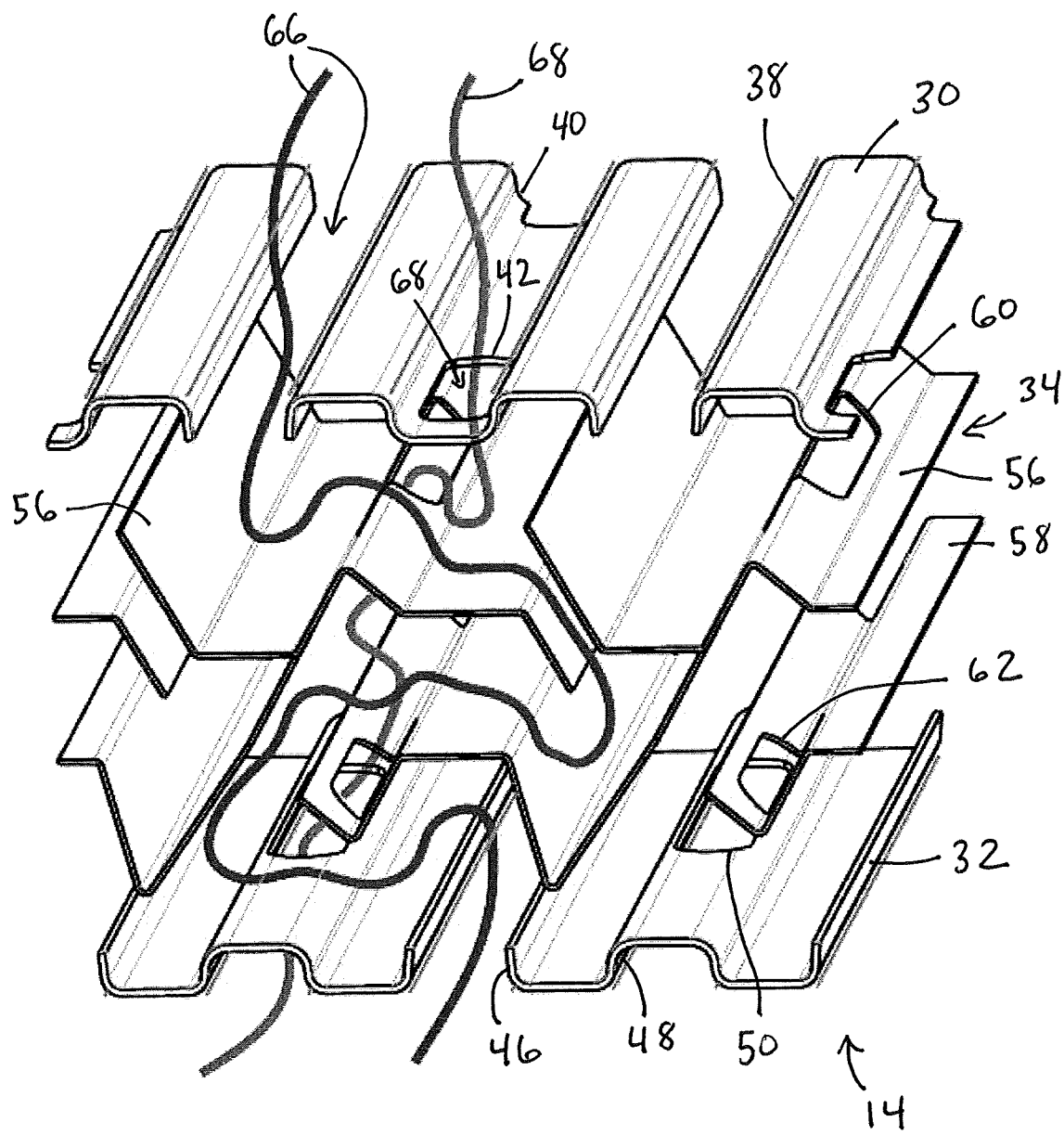
FIG. 4 is a perspective view of a portion of the grease filter of FIG. 1, showing the primary and bypass air flows passing through the grease filter.
Figure 5:
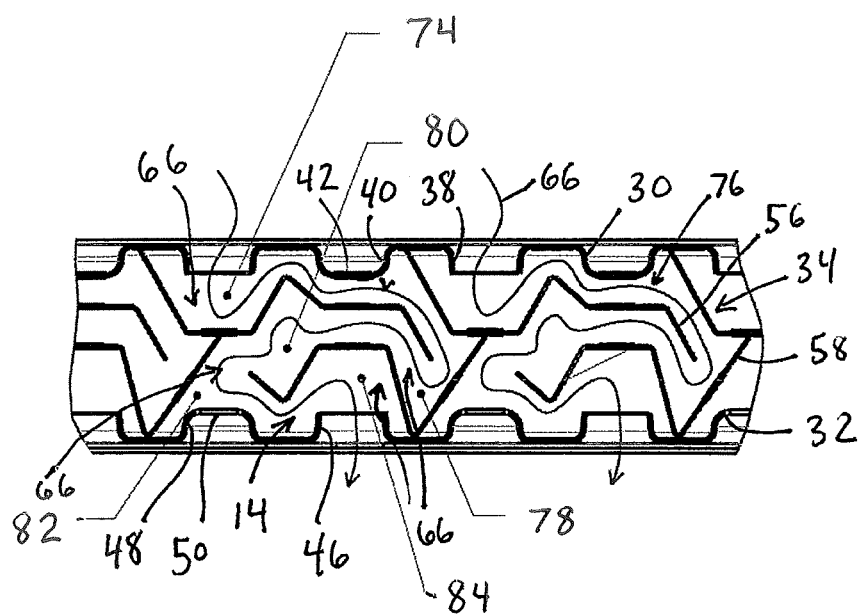
FIG. 5 is an end view of a portion of the grease filter of FIG. 1, showing the primary air flow passing through the grease filter.

As best shown in FIGS. 4 and 5, the primary air flow channel, airstream, or flow 66 commences with a first collection chamber 74 directly adjacent the front panel entrance opening 38. The first collection chamber 74 extends to a serpentine first narrow channel 76 which in turn extends to a second collection chamber 78. The second collection chamber 78 extends to an expansion and turbulence chamber 80, which in turn extends to a third collection chamber 82, which in turn extends to a fourth collection chamber 84. The fourth collection chamber 84 extends to the rear panel exit opening 46. As such, all these portions are in fluid communication with each other so as to define a complete channel from the front panel entrance openings 38 to the rear panel exit openings 46.

Figure 6:
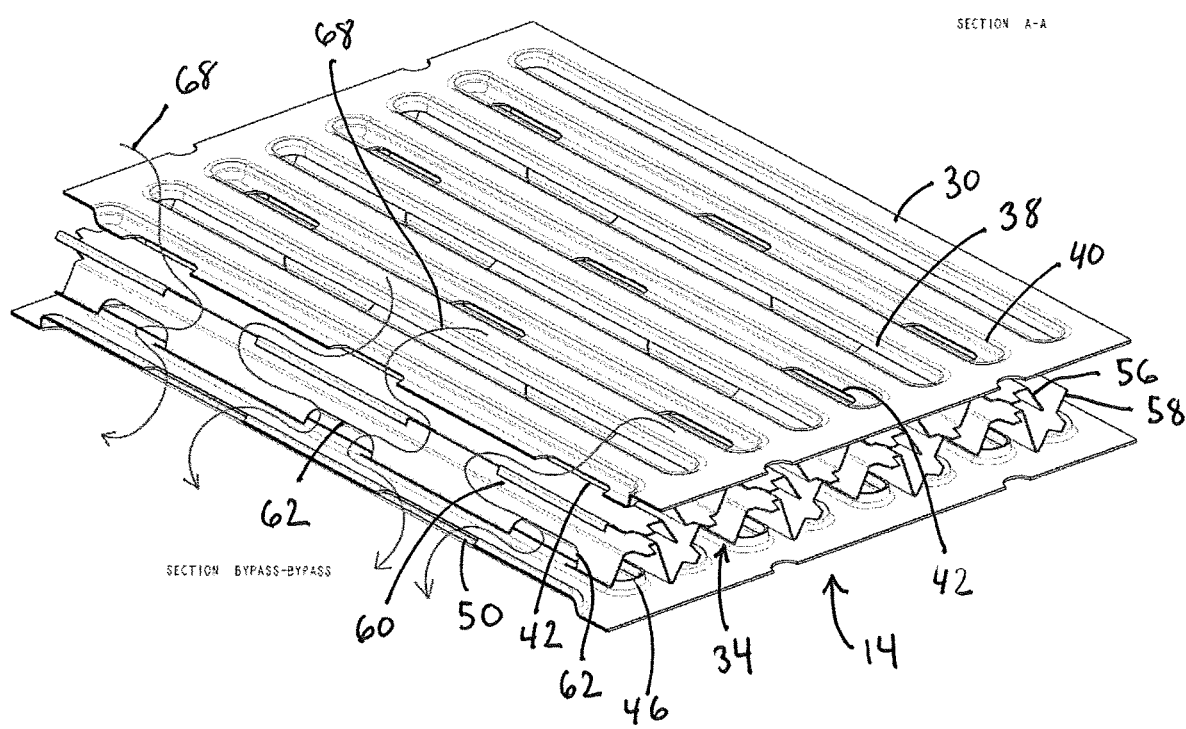
FIG. 6 is a perspective view of a portion of the grease filter of FIG. 1, showing the bypass air flow passing through the grease filter.

As best shown in FIGS. 4 and 6, the bypass air flow channel, airstream or flow 68 intersects with or crosses through portions of the primary air flow channel 66. The bypass air flow channel 68 commences with the first bypass hole 42 of the front panel 30 and extends across the first narrow channel 76 to the second bypass hole 60. The bypass air flow channel 68 continues across the expansion and turbulence chamber 80 to the third bypass hole 62 wherein it then continues across the third collection chamber 82 to the fourth bypass hole 50 wherein it exits the grease filter 10.

All components of the grease filter 10 are preferably made of a stainless steel material for ease of cleaning and the limitation of corrosion. However, it should be understood that the grease filter may be made of other metals or the like which can withstand such high heat environments.

In use, the grease filter 10 is mounted to the ventilation system of a restaurant in the conventional manner. As the ventilation system pulls air through the grease filter 10, portions of the flowing airstream or air flow may take two different paths through the grease filter 10.

The first or primary path or air flow accommodates for the majority of the air flow passing through the grease filter. The primary air flow enters the grease filter 10 through the large elongated entrance openings 38 of the front panel 30 and into the first collection chamber 74 wherein the increase in channel volume causes the air flow to slow and the fatty particles to separate from the air flow. The primary air flow then continues through the first narrow channel 76 wherein the undulations or turns cause further separation of the fatty particles. The primary air flow then continues into the second collection chamber 78 having the 180 degree turn which causes fatty particles to separate further. Next, the primary air flow passes into the expansion and turbulence chamber 80 causing further separation of the fatty particles. The primary air flow then enters the fourth collection chamber 84 where it then exits the grease filter 10 through the exit openings 46 of the rear panel 32.

The bypass air flow 68 enters the grease filter 10 through the first bypass holes 42 in the front panel 30. These first bypass holes 42 are much smaller is size than the entrance openings 38, and therefore accommodate a smaller volume or flow of air. The bypass air flow 68 then passes longitudinally and laterally across the first narrow channel 76 to and through the second bypass holes 60. The bypass air flow 68 then passes longitudinally and laterally across the expansion and turbulence chamber 80 to and through the third bypass holes 62. The large chamber volume and the longitudinal movement of the bypass air flow 68 across and through the primary airflow 66 creates a large air turbulence within the airstream which increases the separation of the fatty particles in the area. Lastly, the bypass air flow 68 then exists the grease filter through the fourth bypass holes 50 in the rear panel 32.

It has been discovered that the long, undulating configuration of the primary air flow or channel 66 greatly increases the separation of the fatty particles from the air stream, however, such a long angular path creates an air flow pressure restriction that is over the 1.5 inches of water requirement. The bypass air flow 68 counteracts this high pressure increase by creating a secondary path which decreases the air pressure to below 1.5 inches of water. The bypass air flow 68 increases air flow by creating a straighter and less convoluted pathway. However, the small hole sizes and longitudinal offset alignments of the bypass holes also prevents flames from propagating through the grease filter 10. It is believed that approximately ⅓ of the airflow through the grease filter 10 passes along the bypass air flow.

It should be understood that as the primary air flow and bypass air flow crosses each other at different areas within the grease filter 10, some entraining or mixing will occur. However, the end result is the decrease in air resistance while providing a greater ability of separating the fatty particles from the air stream or flow.

It thus is seen that a grease filter system is now provided that increase the capturing of fatty particles without increasing the air restriction through the grease filter. It should be understood that many modifications may be made to the specific preferred embodiment described herein, in addition to those specifically recited, without departure from the spirit and scope of the invention as described by the following claims.

The invention claimed is:

1. A grease filter comprising,
  a frame, and
  a baffle assembly coupled to said frame, said baffle assembly including a front panel having a plurality of front panel elongated slots therethrough, a rear panel having a plurality of rear panel elongated slots therethrough, and an air deflector assembly positioned between said front panel and said rear panel, said air deflector assembly having a plurality of primary channels defined by a plurality of baffle walls creating a first flow path and a plurality of bypass channels defined by a plurality of bypass holes extending through said baffle walls creating a second flow path separate from said first flow path, said first flow path not including passage through said plurality of holes extending through said baffle walls, whereby an airstream passing through the grease filter has a first flow path passing through the primary channel and a second flow path passing through the bypass channel.

2. The grease filter of claim 1 wherein said baffle walls include a first baffle wall having at least one first bypass hole associated with each said bypass channel and a second baffle wall having at least one second bypass hole associated with each said bypass channel.

3. The grease filter of claim 2 wherein said second bypass hole is not aligned with a first bypass hole.

4. The grease filter of claim 2 wherein said at least one second bypass hole includes a pair of second bypass holes, and wherein said at first bypass hole is aligned between said pair of second bypass holes.

5. The grease filter of claim 2 wherein said front panel includes at least one front panel bypass hole associated with each said bypass channel.

6. The grease filter of claim 5 wherein said rear panel includes at least one rear panel bypass hole associated with each said bypass channel.

7. The grease filter of claim 6 wherein said first bypass hole is not aligned with said front panel bypass hole, wherein said second bypass hole is not aligned with said first bypass hole, and wherein said rear panel bypass hole is not aligned with said second bypass hole.

8. The grease filter of claim 6 wherein said grease filter includes a plurality of front panel bypass holes, a plurality of first bypass holes, a plurality of second bypass holes, and a plurality of rear panel bypass holes, and wherein said first bypass holes are not aligned with said front panel bypass holes, wherein said second bypass holes are not aligned with said first bypass holes, and wherein said rear panel bypass holes are not aligned with said second bypass holes.

9. The grease filter of claim 8 wherein each said front panel bypass hole is positioned between a pair of said front panel elongated slots.

10. The grease filter of claim 9 wherein each said rear panel bypass hole is positioned between a pair of said rear panel elongated slots.

11. A grease filter comprising,
a housing, and
a front panel coupled to said housing having a plurality of front panel openings therethrough, a rear panel coupled to said housing having a plurality of rear panel openings therethrough, and an air deflector assembly positioned between said front panel and said rear panel, said air deflector assembly having a plurality of primary channels, each said primary channel extending between and in fluid communication with at least one said front panel opening and at least one said rear panel opening, each said primary channel being defined by baffle walls, said baffle walls also having a plurality of bypass holes therethrough, said baffle walls defining a first flow pathway passing between said baffle walls without passing through said baffle wall bypass holes, and defining a second flow pathway including passing through said baffle wall bypass holes, whereby the bypass holes define a bypass path through the grease filter.

12. The grease filter of claim 11 wherein said baffle walls include a first baffle wall having at least one said bypass hole and a second baffle wall having at least one said bypass hole.

13. The grease filter of claim 12 wherein said second baffle wall bypass hole is not aligned with said first baffle wall bypass hole.

14. The grease filter of claim 12 wherein said second baffle wall includes a pair of second bypass holes, and wherein said first baffle wall bypass hole is aligned between said pair of second baffle wall bypass holes.

15. The grease filter of claim 11 wherein said front panel includes at least one front panel bypass hole.

16. The grease filter of claim 15 wherein said rear panel includes at least one rear panel bypass hole.

17. The grease filter of claim 12 wherein said front panel includes at least one front panel bypass hole which is longitudinally offset from said first baffle wall bypass hole, wherein said second baffle wall bypass hole is longitudinally offset from said first baffle wall bypass hole, and wherein said rear panel includes at least one rear panel bypass hole which is longitudinally offset from said second baffle wall bypass hole.

18. The grease filter of claim 11 wherein said air deflector assembly includes a first baffle wall and a second baffle wall, and wherein said grease filter includes a plurality of front panel bypass holes extending through said front panel, a plurality of first bypass holes extending through said first baffle wall, a plurality of second bypass holes extending through said second baffle wall, and a plurality of rear panel bypass holes extending through said rear panel, and wherein said first bypass holes longitudinally offset from said front panel bypass holes, wherein said second bypass holes are longitudinally offset from said first bypass holes, and wherein said rear panel bypass holes are longitudinally offset from said second bypass holes.

19. The grease filter of claim 18 wherein each said front panel bypass hole is positioned between a pair of said front panel openings.

20. The grease filter of claim 19 wherein each said rear panel bypass hole is positioned between a pair of said rear panel openings.

21. A grease filter comprising,
a housing, and
a front panel coupled to said housing having a plurality of front panel slots therethrough, a rear panel coupled to said housing having a plurality of rear panel slots therethrough, a first baffle wall positioned between said front panel and said rear panel, said first baffle panel having a plurality of first bypass holes therethrough, a second baffle panel positioned between said first baffle panel and said rear panel, said second baffle panel having a plurality of second bypass holes therethrough, said front panel, said first baffle panel, said second baffle panel and said rear panel defining a primary air flow channel extending between said front panel slots and said rear panel slots.

22. The grease filter of claim 21 wherein said front panel also has a plurality of front panel bypass holes therethrough.

23. The grease filter of claim 22 wherein said rear panel also has a plurality of rear panel bypass holes therethrough.

24. The grease filter of claim 23 wherein said front panel bypass holes are longitudinally offset from said first bypass holes, wherein said second bypass holes are longitudinally offset from said first bypass holes, and wherein said rear panel bypass holes are longitudinally offset from said second bypass holes.

\* \* \* \* \*